United States Patent [19]
Potter et al.

[11] Patent Number: 5,410,252
[45] Date of Patent: Apr. 25, 1995

[54] MAGNETIC SURVEY TECHNIQUE FOR DETERMINING SUBSURFACE ENVIRONMENTAL CONTAMINATION

[75] Inventors: Michael Potter, 7052 Edgewater Rd., Willis, Tex. 77305; Ron Sabala; Mustafa Saribudak, both of The Woodlands, Tex.

[73] Assignee: Michael E. Potter, Willis, Tex.

[21] Appl. No.: 889,501

[22] Filed: May 27, 1992

[51] Int. Cl.$^6$ ............................ G01V 3/00; G01V 3/08
[52] U.S. Cl. ............................................... 324/345
[58] Field of Search ........................ 324/331, 345, 346

[56] References Cited

U.S. PATENT DOCUMENTS

| | | | |
|---|---|---|---|
| 2,770,305 | 11/1956 | Pirson | 324/345 |
| 4,939,460 | 7/1990 | Patla et al. | 324/345 |

OTHER PUBLICATIONS

Machel et al., "Causes and Spatial distribution of Anomalous magnetization in Hydrocarbon Seepage Environments", The American Association of Petroleum Geologists Bulletin vol. 75, No. 12 (Dec. 1991) pp. 1864–1876.

Primary Examiner—Walter E. Snow
Attorney, Agent, or Firm—Browning, Bushman, Anderson & Brookhart

[57] ABSTRACT

A technique for determining the extent of underground contamination within a test area involves recording of magnetic measurements at each of a plurality of test sites to generate magnetic test data. The generated magnetic test data is grouped within one of a plurality of selected data ranges, and the grouped data is displayed as a function of the test area. The displayed test data may be compared with base data related to underground contamination to determine the extent of contamination within the test area. Generated data is grouped within the plurality of data ranges each having variation of less than 25 gammas, and multiple groupings of data may be displayed with similarly colored data within one of a plurality of levels. The displayed test data may be compared with the contamination level from one or more contamination locations within the test area, and contamination locations overlayed on a map of the test area with the grouped magnetic test data.

19 Claims, 1 Drawing Sheet

MAGNETIC SURVEY TECHNIQUE FOR DETERMINING SUBSURFACE ENVIRONMENTAL CONTAMINATION

FIELD OF THE INVENTION

The present invention relates to techniques and methods for determining the extent of environmental contamination. More particularly, this invention utilizes magnetic survey techniques to evaluate the extent and pattern of sub-surface contamination due to migration of contaminants from known or presumed sources.

BACKGROUND OF THE INVENTION

The identification of sub-surface contamination and the determination of the area and depth of such contamination is a significant and increasing problem. Both private industry and governmental or quasi-governmental agencies recognize the growing severity of sub-surface contamination, and the attendant financial costs to clean-up such sites in order to reasonably protect the public. Real property purchasers frequently desire assurances that considered sites are not contaminated or, if contaminated, that the contamination is not migrating to new areas. While both private and public funds are being allocated to clean-up contaminated sites, there is increasing evidence that the contamination may not be "contained" as much as once believed, and that improved systems to monitor migration of sub-surface contamination may be required to properly evaluate the desired corrective action and reasonably predict the environmental clean-up costs.

Sub-surface contamination testing techniques typically involve the taking of numerous sub-surface fluid samples from various test wells, followed by the laboratory analysis of such samples. While these testing techniques are reasonably reliable, they are extremely expensive and time consuming, since a test hole must be drilled to the desired depth at each test site. To properly evaluate a property for environmental contamination and migration, hundreds of test wells might have to be drilled, and thousands of test samples might have to be analyzed. These techniques are not only expensive, but often delay by months or years the most practical utilization of the property. Surface vapor measurements are sometimes taken, since this technique is comparatively inexpensive and may be quickly performed. Those skilled in subsurface contamination recognize, however, that this technique is highly unreliable, has little utility for many contaminants, and at best is used for recently contaminated sites wherein the contamination is less than 1 or 2 meters deep.

Magnetic survey techniques have been used in recent years in an attempt to better evaluate the likelihood of recoverable hydrocarbon reservoirs by determining the depth and pattern of sedimentary rock formations containing magnetic minerals, such as magnetite. Utilizing airplanes, large area magnetic surveys have been conducted to estimate, for example, the depth to igneous rock and the thickness of sedimentary rock formations. Such magnetic survey techniques might also be used to identify structures such as faults, folds and other shifts in rock formations. This information may then be used by geologists to estimate the likelihood of recovering hydrocarbons, thereby justifying an exploratory well.

Magnetic survey techniques have also been utilized by archaeologists to assist in locating sub-surface structures or objects at relatively shallow depths of, e.g., 3 to 10 meters. In this case, researchers would monitor magnetic properties while walking over a potential site of interest. The buried materials of interest, such as a building wall or storage chest, will likely have different magnetic properties than the surrounding fill soil, which may be more or less magnetic than the structure of interest. Archaeologists are primarily interested in significant localized magnetic changes and/or magnetic readings which correspond to a presumably man-made geometric pattern. Using these techniques, it is thus possible to predict the approximate location of a structure of interest and thus reduce excavation costs.

A recent article by Machel and Burton entitled "Causes and Spatial Distribution of Anomalous Magnetization in Hydrocarbon Seepage Environments" discusses hydrocarbon seepage and migration resulting in anomalous magnetization prior to hydrocarbon invasion. The article discusses various theories, including geochemical processes and microbial processes involving aerobic or anaerobic conditions, in an attempt to explain how subsurface magnetic properties might be affected by hydrocarbons. While the primary purpose of the article appears to be the consideration that magnetic contrasts might be used in the future for hydrocarbon exploration, the paper does indicate that such magnetic anomalies may also be used to detect hydrocarbon leakage from storage tanks or waste disposal sites. Based on the information available to the inventors, no commercial activity involving this suggestion has yet occurred. The factors affecting magnetic changes when sub-surface rock is subjected to hydrocarbons are not fully understood, and techniques suggesting that magnetic surveys could be used to detect hydrocarbon reserves (as compared to rock formation depths) have not been commercially unproven.

People knowledgeable in contamination testing have long assumed that magnetic techniques could not be used to detect or evaluate sub-surface contamination, and have considered magnetic survey techniques, while perhaps hypothetically interesting, lacking practical utility. The amount of contaminate material, such as hydrocarbons, necessary to create a significant environmental problem is, of course, markedly less than the amount of material geologists and geophysists are seeking when utilizing magnetic survey technologies to locate potential mineral sites or to locate rock formations which are likely candidates for hydrocarbon exploration. Practical application of magnetic survey techniques for detecting contamination has thus not occurred. Various techniques have been proposed for reducing the cost of detecting subsurface contamination, but drilling of conventional boreholes and surface vapor measurements remain the only techniques which are widely recognized as having practical reliability.

Improved techniques are required to evaluate sub-surface contamination, and to reduce both the cost and time involved to make such evaluations. Such improved techniques have long been needed in the industry involved in evaluating environmental contamination to reduce risks, minimize clean-up costs, and provide higher assurances of public safety.

SUMMARY OF THE INVENTION

The present invention utilizes magnetic survey techniques to evaluate subsurface contamination. The techniques of the present invention may be used, for example, to detect the pattern or plume of sub-surface hydrocarbon migration from a source. A buried tank or pipeline may have slowly leaked hydrocarbons into the soil for an extended time, and the escaping hydrocarbons typically will migrate in a pattern or plume from the leakage site. The course and propagation speed for a contaminating material which defines the plume is a complex phenomenon functionally related to various geological and geochemical factors. The present invention utilizes magnetic survey technology to detect relatively minor changes in the magnetic field caused by or resulting from the hydrocarbon migration, thereby providing a mechanism to determine the area and depth of the contamination, as well as the relative level of contamination within the plume. While the reasons for magnetic field changes in the area of sub-surface hydrocarbon contamination are not yet fully understood, such changes are believed to be attributable to the creation or destruction of metallic compounds, or the transfer of metallic compounds to new sites with the hydrocarbon migration, and/or the reaction of hydrocarbons and existing sub-surface minerals.

In an exemplary technique of the present invention, a magnetometer is used to detect magnetic measurements at established grid points, thereby developing the data for the magnetic survey. Magnetic data is electronically transferred from the magnetometer microprocessor to a central computer, and corrective data is input to reduce or eliminate the affects of known non-contaminating magnetic interference sources, such as buildings, fences, electrical power lines and pipelines, on the measured data. The corrected data is then processed and plotted to generate magnetic contour maps which illustrate magnetic field intensities and the potential areas of contamination. In most cases, this magnetic survey data will be compared with other known or presumed base data related in some manner to underground contamination to identify with high accuracy the plume of contamination. Base data may include one or more of magnetic readings taken adjacent a known contamination site, magnetic readings taken from known areas free of contamination, the location of possible contamination sources within or adjacent the test area, data from one or more monitored contamination wells within the test area, surface vapor measurements, soil samples, and data from an adjacent or similar geographic location. Also, the pattern of the magnetic contour mapping provides useful information to correlate particular data with a contamination plume, since the pattern of the map contour in an area of contamination will normally correspond to known or presumed plume patterns for the type of sub-surface rock in the test area.

To further assist in analyzing field data, soil samples at a test site may be subjected in the laboratory to the contaminating material (optionally at an elevated temperature to increase reaction time), and changes in magnetic properties of these samples measured and field data correlated with laboratory data. A data bank of magnetic measurements from known soil chemistry samples, as well as optional measurements after reaction of such samples with known contaminates, may further assist in interpreting magnetic field data. Magnetic survey tests taken over a period of months may be compared to further define the contamination plume and determine to future course and propagation speed of the plume.

It is an object of this invention to provide improved non-evasive techniques to determine the extent of sub-surface environmental contamination. Magnetic survey measurements taken at selected surface locations are utilized to determine minor magnetic changes attributable to environmental contamination. Magnetic survey data is corrected (if necessary), similar data is grouped, and the data is plotted. The plotted data may be correlated with known or presumed base data related to underground contamination. The configuration of plotted data may also assist in determining which data is indicative of sub-surface contamination. A comparison of plotted data taken from a test area and magnetic date measurements from areas previously tested may provide a reliable basis to identify areas of contamination (and the relative degree of contamination) within the test area.

It is a feature of the invention that micromagnetic survey techniques are employed to determine relatively small magnetic changes in sub-surface formations caused by or attributable to liquid contamination, such as hydrocarbons. Magnetic readings are taken and plotted over a relatively broad range, typically in excess of 150 gammas, to assist in determining the contaminated plume. Data is preferably grouped and plotted over a relatively narrow range, typically from 5 gammas to 25 gammas. Specific data measurements may be corrected, discounted, or fully ignored to account for magnetic changes caused by known non-contaminating sources, such as a buried pipeline.

The present invention has a substantial advantage of relatively low cost compared to existing, reasonably reliable contamination measurement techniques. Contamination tests and analysis may be performed in a relatively short time period of several days, while comparable information obtained from drilled test holes may require months. Plotted data is compared to base data which is related to underground contamination to determine the extent of any underground contamination within the test area. Data analysis may be enhanced by performing magnetic tests on soil samples before and after the sample is contaminated with the known or presumed contaminant, by comparing test data with magnetic data from soil samples having a similar chemistry, and/or by conducting surveys over a time period to determine changes attributable to expansion of the contamination plume.

These and further objects, features and advantages of the present invention with become apparent from the following detailed description, wherein reference is made to the figure in the accompanying drawing.

DETAILED DESCRIPTION OF PREFERRED EMBODIMENTS

Figure 1:
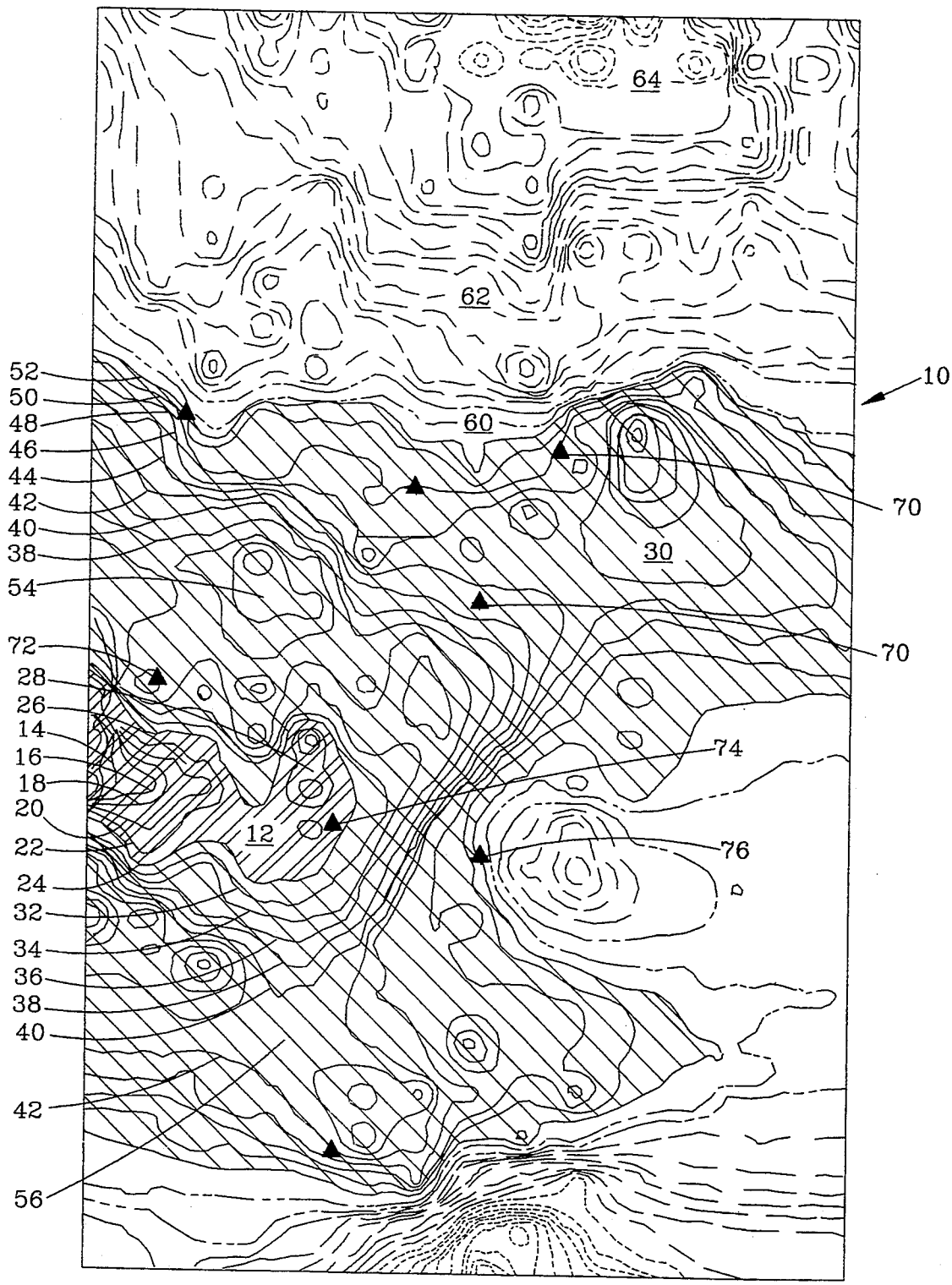
FIG. 1 is a plot of magnetic data taken over a test location. The magnetic data is grouped to illustrate comparable data readings, and the position of existing contamination monitoring wells within the test area are overlaid on the plotted magnetometer data.

The present invention will hereafter be described with respect to determining the plume of contamination and the comparative level of contamination within that plume over a test area adjacent a hydrocarbon fuel storage tank. The test area may include several test boreholes used to periodically monitor vapors and to obtain sub-surface fluid samples at various depths. A positive reading indicative of contamination from one or more of these test wells may thus provide a reasonably reliable indication that fuel is leaking from one or more tanks and is migrating into the test area. The techniques of the present invention may be used to determine the configuration of the expanding plume, which may then assist in determining the appropriate corrective action.

While the invention is described below with respect to detecting hydrocarbon fuel leakage from an underground storage tank, it should be understood that the techniques of the present invention may be used for determining the plume of various underground contaminants attributable to hydrocarbon-based or non-hydrocarbon-based substances from a variety of sources. Magnetic testing according to the present invention may thus be used for the following exemplary applications: testing for oil loss from a pipeline, determining the sub-surface chemical contamination plume from an industrial processing plant, testing for sub-surface migration of gasoline from a refueling station onto an adjoining property, determining the extent of sub-surface contamination from a metal plating operation, monitoring the plume of escaping oil from an underground saltdome, or determining the extent of underground contamination from a chemical waste site or landfill.

While various magnetic survey techniques may be used according to the present invention, the presently preferred technique utilizes micromagnetics. A surface magnetometer is employed to detect comparatively small magnetic changes in sub-surface formations, typically having a depth of from 1 meters to 25 meters. The magnetic intensity between adjacent test points which preferably define a regular grid pattern may vary by 20 gammas or less. A wide spectrum of measurements typically extending over a range of from 100 gammas to 200 gammas may be obtained, and these data measurements corrected, if necessary, and plotted.

Other magnetic survey techniques may also be employed, either alone or in combination with micromagnetics, to determine sub-surface contamination. Various alternative electromagnetic techniques, including ground penetrating radar or I.P. induced polarization may be utilized, and/or envirometric techniques may be employed. These techniques may further assist in determining the magnetic intensity, depth of magnetic rock formations, and/or magnetic resistance at various test sites, and may also be used to determine the magnetic susceptibility of soil samples taken from specific test sites both before and after such samples are contaminated.

In a typical application, determining the extent of underground contamination involves the step of first selecting a plurality of test sites spread throughout a ground surface of the test area. A typical rectangular-shaped test area 10 is depicted in FIG. 1. The actual test area may have dimensions of 230 meters×480 meters and, for such a test area, test sites establishing a uniform grid pattern may be spaced at approximately 17 meter intervals (test sites on corners of 17×17 meter grid squares. Non-magnetic flags or other markings may be placed at each test site, and the flags each labeled in a manner such that each test site may be subsequently plotted on a map.

An operator may then utilize a magnetometer to take a magnetic reading at each test site. A model G-9856 Proton Magnetometer manufactured by EG & G may be used with a pole-like sensor. With the magnetometer positioned over or closely adjacent a marked test site, the operator may enter the site number into a portable computer, take a magnetometer measurement reading, then enter the magnetometer reading into the portable computer to correlate with the numbered of test site information. While manual recordation techniques may alternatively be used, the above process is productive and highly reliable. In this manner, magnetic test data may be generated, with each data measurement corresponding to a specific test site within the test area.

Once the magnetometer data has been obtained, further information may be generated to make necessary corrections to the test data. The operator may observe, for example, a fence line or pipeline markings on the test site, and the presence of these physical structures will likely introduce errors into the analysis if not corrected. The precise location of one or more non-contaminating magnetic sources may thus be determined, either by visual inspection or by using the magnetometer to note the position of peak magnetometer readings while traversing the vicinity of the non-contaminating magnetic source. Magnetic measurements may thus be recorded in the vicinity of each of these one or more non-contaminating magnetic sources which may be within or close adjacent the test site. Alternatively, the previously generated data may be used to determine the position of a non-contaminating magnetic source on the test site. Once the position of such a source has been determined or is presumed, the spacing between each of the one or more non-contaminating sources and each of the plurality test sites may be determined. A magnetic correction factor attributable to each of the non-magnetic sources and functionally related to this spacing may then be calculated, and the magnetic test data adjusted by this correction factor. Alternatively, magnetic test data which is known or presumed to have been significantly altered by non-contaminating magnetic sources may be partially discounted or completely ignored. The number of data points affected by such non-magnetic sources may typically be nominal compared to the test data which are not affected by such sources. If the measured magnetometer information from test points affected by such non-contaminating magnetic sources is not utilized, such information be interpolated or otherwise inferred from adjacent test data.

The gathered magnetometer data may then be transferred electronically from the portable computer to a permanent computer for data manipulation and storage. The larger computer will typically perform the necessary corrections to the recorded data, if necessary, based upon information supplied by the operator. The stored magnetic test data may then be grouped by this computer within one of a plurality of selected data ranges. The preferred data ranges largely depend upon the overall variation in the recorded data and the size of the test area. Data ranges will typically vary from 5 gammas to 25 gammas, and more preferably will range from about 10 to about 20 gammas. Each magnetic test data measurement taken from the field is correlated with a particular test site, and this correlation remains as the data is manipulated and, if necessary, corrected. If desired, an output of magnetic test data within a selected data range may be generated, so that the operator can make initial determinations with respect to the selected data ranges then adjust the selected data ranges to provide more meaningful groupings of test data.

The group test data may then be displayed, either on a computer screen or on a permanently recordable medium, such as paper. In the preferred technique, the grouped magnetic test data is displayed as a function of the test area, i.e., data is overlayed on a representation of the test area, such as a map. The test data sites optionally may also be noted on the map, and the location of any non-contaminating magnetic sources may also be indicated on the map. The particular position of test sites wherein the corresponding magnetometer data has been corrected or ignored may further be indicated. While various techniques may be used displaying the magnetometer data itself, a preferred technique graphically depicts the borders of grouped data in a manner similar to a topography map. To further assist in the comparison of displayed data, data for a plurality of groupings may be similarly identified. This latter identification preferably is a color-coded identification, although alternatively a similar cross-hatching identification and/or a similar borderline identification for a plurality of groupings within one of a plurality of levels may be utilized.

Referring to FIG. 1, a grouped data for area 12 is double-cross hatched, and represents a level of magnetometer readings of less than 52679 gammas. Within this double-cross hatched area, line 14 illustrates graphically the border between magnetometer readings of 52629 and 52630, while line 16 illustrates the boarder between readings of 52639 and 52640. Similarly, lines 18, 20, 22 and 24 provide the upper limit of magnetometer readings and gammas of measurements in the 52640's, 52650's, 52660's and 52670's, respectively. The magnetometer readings within areas 26 and 28 depicted in FIG. 1 will thus correspond with magnetometer readings between border lines 20 and 22, and accordingly will represent an area which corresponds to magnetometer readings from 52650 to 52659 gammas.

In a similar manner, the area 30 which is single cross-hatched in FIG. 1 may represent a level of magnetometer measurements of from 52680 to 52790. Border lines 32, 34, 36, 38, 40, 42, 44, 46, 48, 50 and 52 each represent the upper limit of a 10 gamma selected range. Accordingly, magnetometer measurements within area 54 depicted in FIG. 1 substantially correspond to magnetometer measurements within area 56, i.e., from 52730 to 52739 gammas. In the next level area 60, the magnetometer groupings within this level shown by border lines of alternating long and short dashes, and the areas between these border lines not cross-hatched. Only two groupings within level area 60 have been selected, so that this level represents a relatively narrow range representing measurements of 52790 to 52809. Similarly, level areas 62 and 64 each have selected groupings of magnetometer measurements, wherein the depicted grouping are defined by border lines having intermediate length dashes and short dashes, respectively.

A preferred technique for determining the extent of underground contamination is to illustrate colored border lines for each of the multiple groupings of data on the representation or map of the test area. Accordingly, all border lines within the double cross hatched area 12 may be colored red, while all border lines in the single cross hatched area 30 may be colored orange. Similarly, border lines in areas 60, 62 and 64 may be colored yellow, green, and blue, respectively. This technique enables one to more clearly compare data on the entire test area, and also to compare the displayed data with base data (background information). While the selected colors for these border groupings are somewhat arbitrary, the color selection logically should illustrate a natural continuum representative of the gradual change in the magnetic readings over the test area.

The last and most significant step in the exemplary process of the present invention is the comparison of the displayed data with background information or base data. This base data may be generated before or after the magnetic data is obtained, and the selected base data will often depend upon a particular information available at or adjacent the test area. FIG. 1 depicts a plurality of monitoring wells 70 overlayed on the test area. Such monitoring wells are frequently used in an area of possible underground contamination, and the detection of contamination at one or more of these wells may have triggered the desire to evaluate the plume of underground contamination. Additional base data information may be the knowledge that a plurality of hydrocarbon storage tanks had been situated for years in the area immediately left of the test area depicted in FIG. 1, and possibly the further information that leakage from these storage has occurred. Still additional base data information may be the knowledge that monitoring wells reflect contamination at a depth of, for example, from 40 meters to 65 meters, and the further knowledge at the slope of the rock formation at this depth is generally in a direction to the right of the storage tanks. Those skilled in the art will appreciate that the monitoring wells depicted in FIG. 1 are expensive, however, and the techniques of the present invention may provide valuable information to assist, for example, in determining whether additional monitoring wells should be drilled, and in determining where such wells preferably should be located.

A comparison of the displayed magnetometer data, grouped in the manner as described above, with the base data thus enables one to reliably determine the extent of underground contamination. For hydrocarbon contamination of many soil sample types, the presence of underground contamination will result in magnetometer readings having lower gamma numbers, and thus the area 30, and particularly the area 12 in FIG. 1, may initially be suspect. Such low gamma readings may be attributable, however, the non-contaminating sources, such as a natural change in the mineral content within the underground formations in these areas. In the illustrated case, however, base data of known contamination levels at the location of the one or more of the monitoring wells, when compared with the illustrated magnetometer data, provides a reliable technique for determining the extent of underground contamination. Evidence of a high contamination level in monitoring wells 72 and 74, combined with a relatively low contamination level in monitoring well 76, thus provides comparison information for determining that low gamma readings are in fact indicative of underground contamination for the test area 10 depicted in FIG. 1. This determination is enhanced by base data relating to the location of the storage tanks, coupled with information regarding the logical direction of underground contamination migration in the zone or depth of rock which is contamination.

Other techniques may be used to generate base data for comparison with the displayed magnetometer data. In some case, displayed magnetometer data may be compared with contamination measurements taken from either surface or subsurface samples at various locations spaced throughout the test area. It is anticipated that useful base data may be obtained by purposefully contaminating soil samples from the test area with known contaminates in laboratory tests, so that the magneto meter properties of the soil samples as affected by the contamination may be determined. In these tests, it may be useful to highly contaminate the sample or to accelerate the effects of contamination, either by using elevated temperatures or other techniques, to more clearly delineate the affects of contamination on the soil samples. Displayed magnetometer data may also be compared with magnetometer data from known contamination sites having similar geological properties. Magnetometer data from adjacent sites free of contamination will often provide very useful information, since the geological properties will be presumed to be the same, and the magnetometer readings will not be affected by contamination. Repeated samples from the same test sites taken over periods of time will illustrate migration of contamination, and this technique is a particular useful for predicting areas which will likely become contaminated in the future if corrective action is not taken.

It is useful to consider the practicality of presumed contamination readings. The pattern or plume of presumed contamination should logically resemble migration patterns, i.e., the plume or pattern should follow known geological information for the test area or for similar areas. Migration of contaminants within a sandstone formation known to slope downward to the southeast should thus be in the generally southeastern direction. Different areas of displayed magnetometer data within the test area may be compared to substantiate presumptions regarding magnetometer readings which are assumed to be indicative of subsurface contamination. The displayed data in FIG. 1 thus supports the hypothesis that hydrocarbons leaking from storage tanks to the left of the test area are migrating to the right and into the test area, and that the area 12 is a highly contaminated area, while area 30 is likely contaminated, but not to the same degree as area 12. The same data would further suggest that areas 62 and 64 are substantially less contaminated or are free of contamination due to the substantial difference in magnetometer readings. As suggested by the above, it is often useful to overlay the base data with the magnetometer data displayed on the depicted test area, and the location of data from monitoring wells 72, 74 and 76 supports the position that areas 12 and 30 are contaminated.

It is also possible to make reasonable assessments regarding the depth of contamination based upon the change in magnetometer readings between adjacent test sites. To make such depth determinations with reasonable precision, the spacing of the test measurements may be shortened, and measurements taken at, for example, 5 meter intervals. According to simplistic magnetometer theory, the depth of the magnetic anomaly (whether resulting in increased or decreased magnetism) is a function of the half-width of the bell-shaped magnetometer curve resulting from a traverse of the anomaly. According to more practical techniques, the slope of the plotted magnetometer data at the inflection point (norm value) may be multiplied by an empirically determined factor to estimate the depth of contamination. Various sophisticated modeling techniques, including Fourier transformations, may be performed on the magnetometer measurements to assists in estimating the depth of contamination. A comparison of magnetometer data from various test sites will be particularly useful in assisting in estimating the depth of contamination, since prior assumptions may be verified and multiplication factors altered based on additional information.

Various modifications from the above technique should be apparent from the above description of one embodiment of the invention. The techniques of the present invention may reliably detect hydrocarbon contamination at the typical depths of from 3 meters to 25 meters, and should also detect underground contamination of various non-hydrocarbon based fluids. Base data may be compared with displayed magnetometer data without illustrating any information regarding the base data on the map containing the magnetometer data. Other changes and modifications should be considered to be within the scope of the invention, which is limited only by the claims which follow.

What is claimed is:

1. A method of determining the extent of underground contamination within a test area, the method comprising:

generating base data related to underground;

selecting a plurality of test sites spaced throughout a ground surface of the test area;

recording a magnetic measurement at each of the plurality of test sites to generate magnetic test data;

grouping the magnetic test data within one of a plurality of selected data ranges each having a variation of less than about 25 gammas;

displaying the grouped magnetic test data as a function of the test area; and comparing the displayed test data with the base data to determine the extent of underground contamination within the test area.

2. The method as defined in claim 1, wherein the step of selecting a plurality of test sites comprises:

selecting test sites defining a uniform grid-shape pattern over at least a portion of the test area.

3. The method as defined in claim 1, further comprising:

correcting the magnetic test data as a function of one or more non-contaminating sources.

4. The method as defined in claim 3, wherein the step of correcting magnetic test data comprises:

recording magnetic measurements in the vicinity of each of the one or more non-contaminating magnetic sources;

determining the spacing between each of the one or more non-contaminating sources and one or more of the plurality of test sites; and calculating a magnetic correction factor attributable to the one or more non-magnetic sources and functionally related to the spacing between the one or more of the plurality of test sites.

5. The method as defined in claim 1, further comprising:

determining the depth of underground contamination at one or more of the plurality of test sites as a function of the change in the magnetic test data from adjacent ones of the plurality of test sites.

6. The method as defined in claim 1, wherein the step of generating base data related to underground contamination action comprises:

determining a contamination condition at one or more locations within the test area.

7. The method as defined in claim 6, wherein the step of comparing the displayed test data with the base data comprises:

overlaying the displayed test data and the one or more locations within the test area.

8. The method as defined in claim 1, wherein the step of generating the base data related to underground contamination comprises:

determining magnetic test data from known contaminated materials.

9. The method as defined in claim 1, wherein the step of recording a magnetic measurement comprises:

positioning a magnetometer over each of the plurality of test sites; and entering the magnetic measurement as a function of the test site into a portable computer.

10. A method of determining the extent of underground contamination within a test area including one or more contamination locations each having a contamination level, the method comprising:

selecting a plurality of test sites spaced throughout a ground surface of the test area;

recording a magnetic measurement at each of the plurality of test sites to generate magnetic test data;

grouping the magnetic test data within one of a plurality of selected data ranges each having a variation of less than about 25 gammas;

displaying the grouped test data as a function of the test area; and comparing the displayed test data with the contamination level from the one or more contamination locations to determine the extent of underground contamination within the test area.

11. The method as defined in claim 10, further comprising: correcting the magnetic test data as a function of one or more non-contaminating sources.

12. The method as defined in claim 10, further comprising:

monitoring the contamination level within one or more test wells within the test area.

13. The method as defined in claim 12, wherein the step of comparing the displayed test data with the contamination level from the one or more contamination locations comprises:

overlaying the displayed test data and the contamination locations within the test area.

14. The method as defined in claim 10, further comprising:

comparing the displayed test data with magnetic test data generated from other test areas.

15. A method of determining the extent of underground contamination within a test area, the method comprising:

generating base data relating to migration of underground fluids;

selecting a plurality of test sites defining a grid-shaped pattern spaced throughout a ground surface of the test area;

positioning a magnetometer over each of the plurality of test sites to generate magnetic test data;

grouping the magnetic test data within one of a plurality of selected data ranges each having a variation of less than 25 gammas;

displaying the grouped test data as a function of the test area; and comparing the displayed test data with the base data to determine the extent of underground contamination within the test area.

16. The method as defined in claim 15, further comprising:

comparing the displayed test data with a contamination level from one or more locations within the test area; and overlaying the displayed data and the locations within the test area.

17. The method as defined in claim 15, wherein the step of grouping magnetic test data comprises:

grouping the magnetic test data within one of a plurality of magnetometer levels each having a range of more than 25 gammas; and grouping magnetic test data within each of the plurality of magnetometer levels within the selected data ranges each having a variation of less than 25 gammas.

18. The method as defined in claim 17, further comprising:

displaying the grouped magnetometer levels as a function of the test area.

19. The method as defined in claim 15, further comprising:

determining magnetic test data from known contaminated materials.

* * * * *